United States Patent
Kim et al.

(10) Patent No.: US 10,694,471 B2
(45) Date of Patent: *Jun. 23, 2020

(54) METHOD AND APPARATUS FOR CONTROLLING UPLINK TRANSMISSION POWER IN WIRELESS COMMUNICATION SYSTEM

(71) Applicant: Samsung Electronics Co., Ltd, Suwon-si (KR)

(72) Inventors: Youngbum Kim, Seoul (KR); Yongjun Kwak, Yongin-si (KR); Jeongho Yeo, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

This patent is subject to a terminal disclaimer.

(21) Appl. No.: 16/408,220

(22) Filed: May 9, 2019

(65) Prior Publication Data

US 2019/0268855 A1    Aug. 29, 2019

Related U.S. Application Data

(63) Continuation of application No. 16/232,897, filed on Dec. 26, 2018, now Pat. No. 10,313,980, which is a (Continued)

(30) Foreign Application Priority Data

Sep. 4, 2015    (KR) .................... 10-2015-0125850

(51) Int. Cl.
*H04W 52/14* (2009.01)
*H04W 52/36* (2009.01)
(Continued)

(52) U.S. Cl.
CPC ......... *H04W 52/146* (2013.01); *H04W 52/14* (2013.01); *H04W 52/24* (2013.01);
(Continued)

(58) Field of Classification Search
CPC ... H04W 52/146; H04W 52/14; H04W 52/16; H04W 52/246; H04W 52/24;
(Continued)

(56) References Cited

U.S. PATENT DOCUMENTS

| 9,420,593 | B2 | 8/2016 | Takeda et al. |
| 9,894,606 | B2 | 2/2018 | Nammi et al. |

(Continued)

FOREIGN PATENT DOCUMENTS

| WO | 2010/123267 A2 | 10/2010 |
| WO | 2012/020990 A2 | 2/2012 |

(Continued)

OTHER PUBLICATIONS

International Search Report dated Sep. 24, 2016 in connection with International Patent Application No. PCT/KR2016/008736.
(Continued)

*Primary Examiner* — Dominic E Rego

(57) ABSTRACT

The present invention defines a method for controlling uplink transmission power of a terminal in a communication system which is operated by combining heterogeneous systems. Specifically, the present invention defines a method for selectively applying a power control command in order to control uplink power of a terminal in a communication system which is operated by combining an LTE/LTE-A system with a system which applies a new radio access technology, and a method for differently operating power control units depending on whether beam sweeping is applied or not. Such methods efficiently control transmission
(Continued)

power of a terminal, and lower the generation of uplink interference signals, thereby improving system efficiency.

15 Claims, 14 Drawing Sheets

Related U.S. Application Data continuation of application No. 15/757,304, filed as application No. PCT/KR2016/008736 on Aug. 9, 2016, now Pat. No. 10,219,225.

(51) Int. Cl.

| | | |
|---|---|---|
| H04W 52/38 | (2009.01) | |
| H04W 88/06 | (2009.01) | |
| H04W 52/24 | (2009.01) | |
| H04W 52/50 | (2009.01) | |
| H04W 52/28 | (2009.01) | |
| H04W 72/04 | (2009.01) | |
| H04W 52/16 | (2009.01) | |
| H04B 7/06 | (2006.01) | |
| H04B 7/08 | (2006.01) | |

(52) U.S. Cl.
CPC ....... *H04W 52/281* (2013.01); *H04W 52/367* (2013.01); *H04W 52/38* (2013.01); *H04W 52/50* (2013.01); *H04W 72/0446* (2013.01); *H04W 88/06* (2013.01); *H04B 7/0617* (2013.01); *H04B 7/0695* (2013.01); *H04B 7/088* (2013.01); *H04W 52/16* (2013.01); *H04W 52/246* (2013.01)

(58) Field of Classification Search
CPC . H04W 52/281; H04W 52/367; H04W 52/38; H04W 52/50; H04W 72/0446; H04W 88/06; H04B 7/0617; H04B 7/0695; H04B 7/088
See application file for complete search history.

(56) References Cited

U.S. PATENT DOCUMENTS

| | | |
|---|---|---|
| 9,924,538 B2 | 3/2018 | Zhang et al. |
| 2003/0235158 A1 | 12/2003 | Lee et al. |
| 2007/0066241 A1 | 3/2007 | Hart |
| 2008/0232333 A1 | 9/2008 | Jeong et al. |
| 2009/0010237 A1 | 1/2009 | Asou et al. |
| 2011/0085548 A1 | 4/2011 | Fernandez |
| 2011/0195735 A1 | 8/2011 | Irmer et al. |
| 2012/0034927 A1 | 2/2012 | Papasakellariou et al. |
| 2012/0039291 A1 | 2/2012 | Kwon et al. |
| 2012/0057547 A1 | 3/2012 | Lohr et al. |
| 2013/0058315 A1 | 3/2013 | Feuersanger et al. |
| 2013/0148614 A1 | 6/2013 | Noh et al. |
| 2013/0324182 A1 | 12/2013 | Deng et al. |
| 2014/0071954 A1 | 3/2014 | Au et al. |
| 2014/0119302 A1 | 5/2014 | Ahn et al. |
| 2014/0233476 A1 | 8/2014 | Kwak et al. |
| 2014/0269575 A1 | 9/2014 | Zhang et al. |
| 2014/0308921 A1 | 10/2014 | Zhang et al. |
| 2014/0369324 A1 | 12/2014 | Lin et al. |
| 2015/0071250 A1 | 3/2015 | Dai et al. |
| 2015/0110056 A1 | 4/2015 | Wang et al. |
| 2015/0173048 A1 | 6/2015 | Seo et al. |
| 2015/0195015 A1 | 7/2015 | Kim et al. |
| 2015/0215022 A1 | 7/2015 | Nagata et al. |
| 2015/0282104 A1 | 10/2015 | Damnjanovic et al. |
| 2015/0289212 A1 | 10/2015 | Januszewski et al. |
| 2015/0351139 A1 | 12/2015 | Zhang et al. |
| 2016/0044599 A1 | 2/2016 | Damnjanovic et al. |
| 2016/0057660 A1 | 2/2016 | Hong et al. |
| 2016/0127094 A1 | 5/2016 | Jiang et al. |
| 2016/0205631 A1 | 7/2016 | Chen et al. |
| 2016/0255593 A1 | 9/2016 | Blankenship et al. |
| 2016/0255594 A1 | 9/2016 | Vajapeyam et al. |
| 2016/0295522 A1 | 10/2016 | Qin et al. |

FOREIGN PATENT DOCUMENTS

| | | |
|---|---|---|
| WO | 2013/100541 A1 | 7/2013 |
| WO | 2013/191360 A1 | 12/2013 |
| WO | 2015/116866 A1 | 8/2015 |
| WO | 2017/172535 A1 | 10/2017 |
| WO | 2017/173177 A1 | 10/2017 |

OTHER PUBLICATIONS

Written Opinion of the International Searching Authority dated Oct. 24, 2016 in connection with International Patent Application No. PCT/KR2016/008736.

MediaTek Inc., "Discussion on longer TTI for PUSCH in CE mode", 3GPP TSG-RAN WG1 Meeting #82, Aug. 24-28, 2015, R1-154710.

Supplementary European Search Report dated Aug. 2, 2018 in connection with International Patent Application No. 16 84 2133, 8 pages.

METHOD AND APPARATUS FOR CONTROLLING UPLINK TRANSMISSION POWER IN WIRELESS COMMUNICATION SYSTEM

CROSS-REFERENCE TO RELATED APPLICATIONS

The present application is a continuation of U.S. patent application Ser. No. 16/232,897 filed on Dec. 26, 2018, which is a continuation of U.S. patent application Ser. No. 15/757,304 filed on Mar. 2, 2018, which is a 371 of International Application No. PCT/KR2016/008736 filed Aug. 9, 2016, which claims the benefit of Korean Patent Application No. 10-2015-0125850 filed Sep. 4, 2015, the disclosures of which are herein incorporated by reference in their entirety.

TECHNICAL FIELD

The present invention relates to a cellular wireless communication system, and more particularly, to a method for controlling an uplink transmission power of a terminal in a communication system in which heterogeneous systems are combined to be operated.

BACKGROUND

In order to meet the wireless data traffic demand that is on an increasing trend after commercialization of 4G communication system, efforts for developing improved 5G communication system or pre-5G communication system have been made. For this reason, the 5G communication system or pre-5G communication system has been called beyond 4G network communication system or post LTE system.

In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive MIMO, full dimension MIMO (FD-MIMO), array antennas, analog beamforming, and large scale antennas for the 5G communication system have been discussed.

Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP) and reception interference cancellation.

In addition, in the 5G communication system, hybrid FSK and QAM modulation (FQAM) and sliding window superposition coding (SWSC), which correspond to advanced coding modulation (ACM) systems, and filter bank multi-carrier (FBMC), non-orthogonal multiple access (NOMA), and sparse code multiple access (SCMA), which correspond to advanced connection technologies, have been developed.

On the other hand, a wireless communication system has been developed from an initial one that provides a voice-oriented service to a broadband wireless communication system that provides a high-speed and high-quality packet data service, like the communication standards, such as 3GPP High Speed Packet Access (HSPA), Long Term Evolution (LTE) or Evolved Universal Terrestrial Radio Access (E-UTRA), LTE-Advanced (LTE-A or E-UTRA Evolution), 3GPP2 High Rate Packet Data (HRPD), Ultra Mobile Broadband (UMB), and IEEE 802.16e. The LTE-A is an evolved system of the LTE, and includes additional functions, such as carrier aggregation (CA) technology and higher-order multiple input multiple output (MIMO) technology, in addition to the existing LTE functions. In the present invention, unless specially mentioned, the LTE-A and the LTE are mixedly used.

In an LTE or LTE-A system that is a representative example of the broadband wireless communication system as described above, an orthogonal frequency division multiplexing (OFDM) method is adapted in a downlink, and a single carrier frequency division multiple access (SC-FDMA) method is adapted in an uplink. The uplink (UL) means a radio link through which a terminal transmits data or a control signal to a base station, and the downlink (DL) means a radio link through which the base station transmits data or a control signal to the terminal. In general, the multiple access method as described above separates data or control information for each user by allocating and operating time-frequency resources on which the data or the control information is carried for each user so that the resources do not overlap each other, that is, so that orthogonality is realized.

FIG. 1 is a diagram illustrating the basic structure of a time-frequency resource region that is a wireless resource region in which data of an LTE or LTE-A system or a control channel is transmitted.

In FIG. 1, a horizontal axis represents a time domain, and a vertical axis represents a frequency domain. The minimum transmission unit in the time domain is an OFDM symbol in the case of the downlink, and it is an SC-FDMA symbol in the case of the uplink. In this case, $N_{symb}$ symbols 102 are gathered to constitute one slot 106, and two slots are gathered to constitute one subframe 105. The length of the slot is 0.5 ms, and the length of the subframe is 1.0 ms. Further, a radio frame 114 is a time domain interval composed of 10 subframes. The minimum transmission unit in the frequency domain is a subcarrier in the unit of 15 kHz, and the transmission bandwidth of the whole system is composed of $N_{BW}$ subcarriers 104 in total.

In the time-frequency domain, the basic unit of a resource is a resource element (RE) 112, and it may be indicated as an OFDM symbol index or an SC-FDMA symbol index and a subcarrier index. A resource block (RB) 108 or a physical resource block (PRB) may be defined as $N_{symb}$ successive OFDM symbols 102 in the time domain or $N_{RB}$ successive subcarriers 110 in the frequency domain. Accordingly, one RB 108 is composed of $N_{symb} \times N_{RB}$ REs 112. In the LTE or LTE-A system, data is mapped in the unit of an RBT, and the base station performs scheduling in the unit of an RB pair constituting one subframe with respect to a specific terminal. The number of SC-FDMA symbols or the number of OFDM symbols $N_{symb}$ is determined in accordance with the length of a cyclic prefix (CP) that is added for each symbol to prevent inter-symbol interference. For example, if a normal CP is applied, the number of OFDM symbols $N_{symb}$ becomes $N_{symb}=7$, whereas if an extended CP is applied, the number of OFDM symbols $N_{symb}$ becomes $N_{symb}=6$. $N_{BW}$ and $N_{RB}$ are in proportion to the bandwidth of the system transmission band. The data rate is increased in proportion to the number of RBs scheduled for the terminal. In the LTE or LTE-A system, 6 transmission bandwidths are defined and operated. In the case of an FDD system in which the downlink and the uplink are discriminated by frequencies to be operated, the downlink transmission bandwidth and the uplink transmission bandwidth may differ from each other.

The channel bandwidth indicates an RF bandwidth that corresponds to the system transmission bandwidth. Table 1 indicates a corresponding relationship between the system transmission bandwidth defined in the LTE or LTE-A system and the channel bandwidth. For example, the LTE or LTE-A system having a channel bandwidth of 10 MHz includes the transmission bandwidth that is composed of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The LTE-A system can support the bandwidth that is wider than the bandwidth of the LTE system for high-speed data transmission. Further, in order for the LTE-A system to maintain backward compatibility for the existing LTE terminals, it is required for even the LTE terminals to receive services by accessing to the LTE-A system. For this, the LTE-A system may divide the whole system band into component carriers (CC) of the bandwidth that can be transmitted or received by the LTE terminal, and may combine several component carriers with each other to provide the services to the terminal. The LTE-A system generates and transmits data for each component carrier, and thus can support high-speed data transmission of the LTE-A system by using transmission/reception processes of the existing LTE system for each component carrier. The LTE-A system can support 5 carrier aggregations (CA) at maximum through the carrier aggregation (CA) technology, and thus it can provide wideband services reaching the bandwidth of 100 MHz (20 MHz×5) at maximum.

Recently, in order to process explosively increasing mobile data traffic, there has been a lively discussion on a 5$^{th}$ generation (5G) system that is the next-generation communication system after LTE/LTE-A. As compared with the existing LTE or LTE-A, the 5G system takes aim at ultra-high-speed data services reaching several Gbps using an ultra-wide band over 100 MHz Since it is difficult to secure the above-described ultra-wide band frequency over 100 MHz in the frequency band in the range of several hundred MHz to several GHz used in the existing mobile communication system, the ultrahigh frequency band of several GHz or several tens of GHz is considered as a candidate frequency in the operating frequency band of the 5G system.

A radio wave of the ultrahigh frequency band as described above may be called a millimeter wave (mmWave) having a wavelength at the level of several millimeters. However, in the ultrahigh frequency band, a path loss of the radio wave is increased in proportion to the frequency band, and thus the coverage of the mobile communication system is decreased.

In order to overcome the drawback of the coverage decrease of the ultrahigh frequency band as described above, a beamforming technology has become important, which increases an arrival distance of the radio wave through concentration of radiation energy of the radio wave on a specific target point using a plurality of array antennas. The beamforming technology can be applied to not only a transmission end but also a reception end. In addition to the coverage increase effect, the beamforming technology also has the effect of reducing interference in regions excluding the beamforming direction. In order for the beamforming technology to operate properly, a method for achieving an accurate measurement of transmitted or received beams and a feedback of the measured beams is necessary.

As another requirement of the 5G system, an ultra-low latency service having about 1 ms or less of transmission delay between the transmission end and the reception end is required. As one scheme for reducing the transmission delay, it is necessary to design a frame structure based on transmit time interval (TTI) that is shorter than that of the LTE or LTE-A system. The TTI is a basic unit to perform scheduling and the TTI of the existing LTE or LTE-A system may be 1 ms corresponding to the length of one subframe. For example, as a short TTI to satisfy the requirements of the ultra-low latency service of the 5G system, the TTI of the 5G system may be 0.5 ms, 0.2 ms, or 0.1 ms that is shorter than that of the existing LTE or LTE-A system.

Accordingly, in a communication system in which the LTE/LTE-A system and the 5G system are combined to be operated, if the TTIs supported by the respective systems are different from each other as described above, it becomes necessary to define a method for a terminal to distribute uplink signal transmission power.

SUMMARY

An aspect of the present invention provides a method for controlling an uplink power of a terminal and the terminal in a communication system in which a system adopting a new radio access technology and an LTE/LTE-A system are combined to be operated as heterogeneous systems.

In one aspect of the present invention, a terminal includes a transceiver configured to perform communication with a first network transmitting and receiving data in a unit of a first transmission time interval (TTI) and a second network transmitting and receiving data in a unit of a second transmission time interval (TTI); and a controller configured to control an uplink transmission power for at least one of the first network and the second network, wherein the control of the uplink transmission power is performed according to respective a TTI length of the first network and a TTI length of the second network.

In another aspect of the present invention, a base station includes a transceiver configured to transmit and receive signals; and a controller configured to generate information on a priority and to transmit the information on the priority to a terminal using higher layer signaling wherein data is transmitted and received in a unit of a first transmission time interval (TTI) between the terminal and the base station, wherein data is transmitted and received in a unit of a second transmission time interval (TTI) between the terminal and another base station, and wherein the information on the priority is used by the terminal to control an uplink transmission power according to the priority in the unit of at least one of the first TTI and the second TTI.

According to the present invention as described above, in a communication system in which a system adopting a new radio access technology and an LTE/LTE-A system are combined to be operated as heterogeneous systems, a terminal efficiently manages the transmission power and lowers the occurrence of an uplink interference signal through a method for controlling an uplink power of the terminal, and thus the system efficiency is heightened.

DETAILED DESCRIPTION

Hereinafter, preferred embodiments of the present invention will be described with reference to the accompanying drawings. In describing the present invention, related well-known functions or configurations incorporated herein are not described in detail in the case where it is determined that they obscure the subject matter of the present invention in unnecessary detail. Further, terms to be described later are terms defined in consideration of their functions in the present invention, but may differ depending on intentions of a user and an operator or customs. Accordingly, they should be defined on the basis of the contents of the whole description of the present invention. Hereinafter, a base station is a subject that performs resource allocation to a terminal, and may be at least one of an eNode B, Node B, base station (BS), radio connection unit, base station controller, and node on a network. The terminal may include user equipment (UE), mobile station (MS), cellular phone, smart phone, computer, or multimedia system capable of performing a communication function. In the present invention, a downlink (DL) is a radio transmission path of a signal that is transmitted from the base station to the terminal, and an uplink (UL) means a radio transmission path of a signal that is transmitted from the terminal to the base station. Further, although embodiments of the present invention are hereinafter described in consideration of an LTE or LTE-A system as an example, the embodiments of the present invention may also be applied to other communication systems having similar technical backgrounds or channel types. Further, the embodiments of the present invention may also be applied to other communication systems through partial modifications thereof in a range that does not greatly deviate from the scope of the present invention through the judgment of those skilled in the art.

In order to stably support mobility of a terminal in the existing mobile communication system as satisfying requirements, such as ultrahigh data services and ultra-low latency services of the 5G system as described above, there is a need for the configuration of an integrated system through combination between a new radio access technology (RAT) adopting a beamforming technology and short TTI operating in the ultrahigh frequency band and the LTE/LTE-A system operating in a relatively low frequency band. In this case, the new radio access technology serves to satisfy the requirements of the 5G system, and the LTE/LTE-A system serves to stably support mobility of the terminal.

Figure 1:
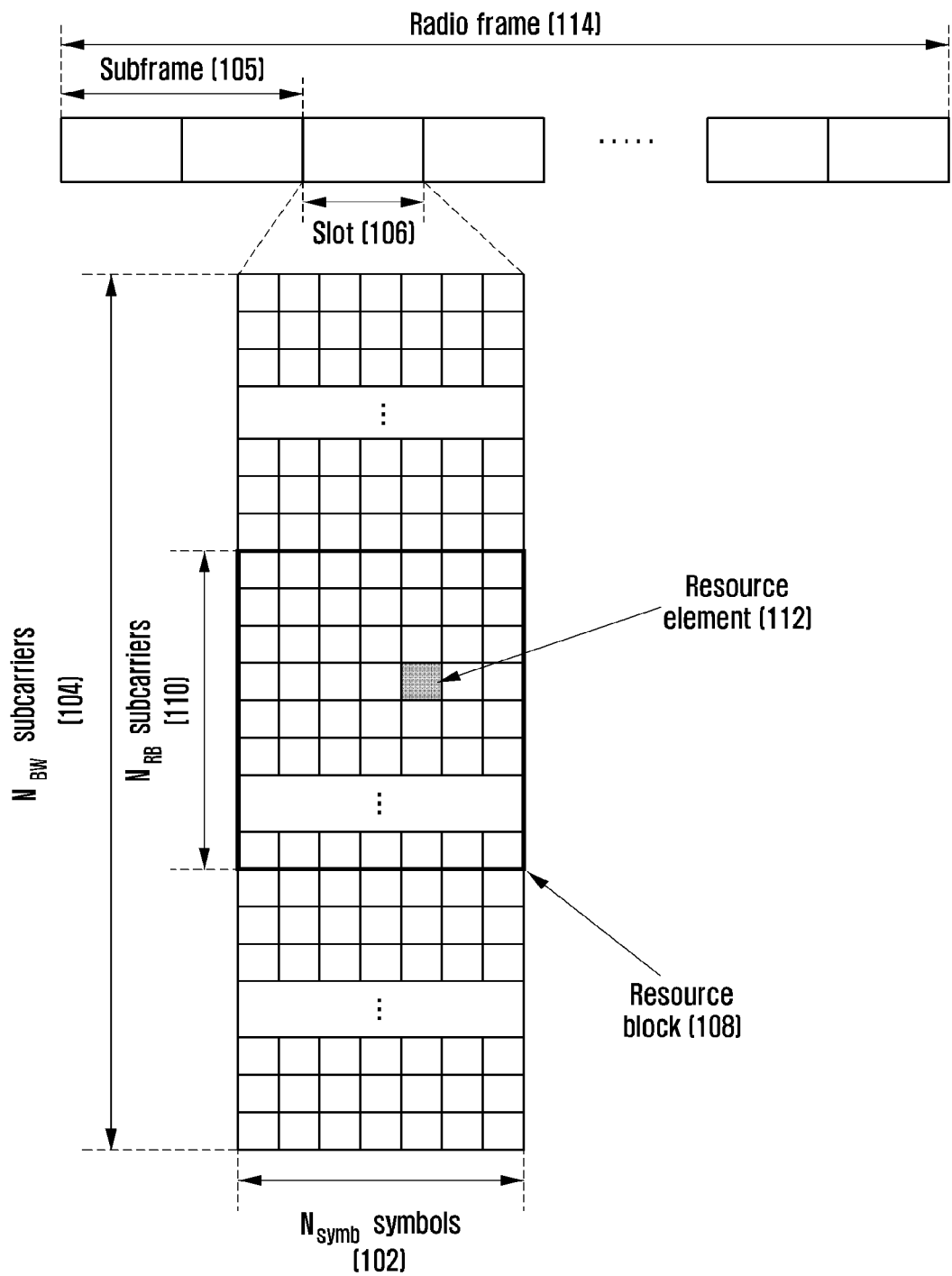
FIG. 1 is a diagram illustrating the basic structure of a time-frequency domain in which data or a control channel is transmitted in an LTE system.
Figure 2:
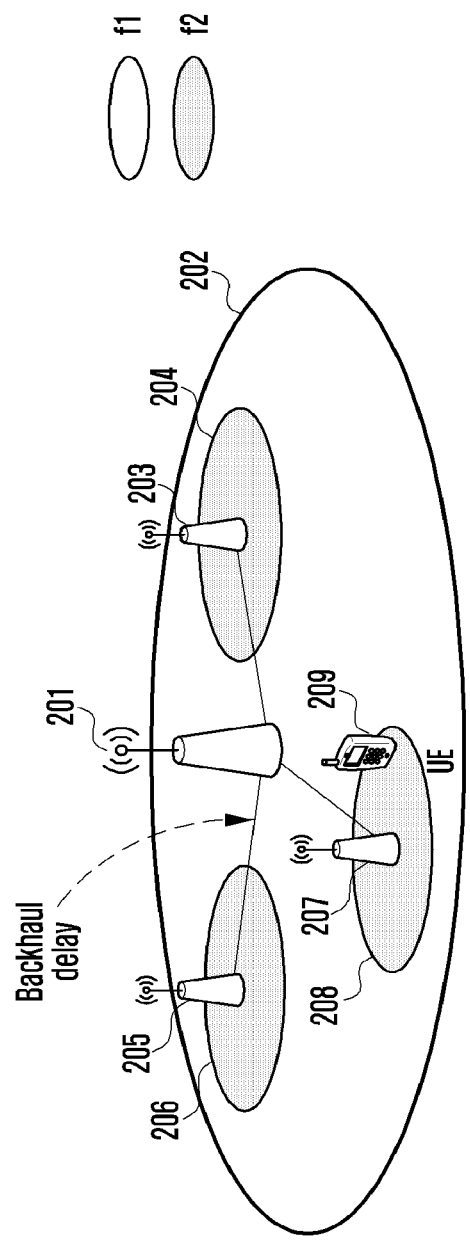
FIG. 2 is a diagram illustrating an example of the configuration of an integrated system in which a base station adopting a new radio access technology and an LTE/LTE-A base station are combined.

FIG. 2 is a diagram illustrating an example of the configuration of an integrated system in which a base station adopting a new radio access technology and an LTE/LTE-A base station are combined. Referring to FIG. 2, small base stations 203, 205, and 207 having relative small coverages 204, 206, and 208 may be deployed in a coverage 202 of a macro base station 201. In general, the macro base station 201 can perform signal transmission with a transmission power relatively higher than that of the small base stations 203, 205, and 207, and the coverage 202 of the macro base station 201 is relatively larger than the coverages 204, 206, and 208 of the small base stations 203, 205, and 207. In an example of FIG. 2, the macro base station may be the LTE/LTE-A system operating in a relatively low frequency band, and the small base stations 203, 205, and 207 may be systems adopting the new radio access technology operating in a relatively high frequency band.

The macro base station 201 and the small base stations 203, 205, and 207 are connected to each other, and depending on their connection state, backhaul delay of a specific level may exist. Accordingly, it may not be preferable to exchange information that is sensitive to transmission delay between the macro base station 201 and the small base stations 203, 205, and 207.

On the other hand, the example illustrated in FIG. 2 exemplifies a carrier aggregation between the macro base station 201 and the small base stations 203, 205, and 207. However, the present invention is not limited thereto, but may be applied to a carrier aggregation between base stations located in different places. For example, the present invention is also applicable to a carrier aggregation between a macro base station and another macro base station that are located in different places and a carrier aggregation between a small base station and another macro base station that are located in difference places. Further, the present invention is not limited in the number of carriers being aggregated.

Referring to FIG. 2, the macro base station 201 may use frequency f1 for downlink signal transmission, and the small base stations 203, 205, and 207 may use frequency f2 for downlink signal transmission. In this case, the macro base station 201 may transmit data or control information to a terminal 209 through frequency f1, and the small base stations 203, 205, and 207 may transmit data or control information to the terminal through frequency f2. Through the above-described carrier aggregation, the base station adopting the new radio access technology capable of performing ultra-wide band support in the high-frequency band may provide ultrahigh-speed data service and ultra-low latency service, and the base station adopting LTE/LTE-A technology in the relatively low frequency band may support the stable mobility of the terminal. In an environment as exemplified in FIG. 2, the operation of the terminal 209 that performs communication by accessing to the macro base station 201 and the small base stations 203, 205, and 207 may be called dual connectivity (DC).

On the other hand, the configuration exemplified in FIG. 2 is applicable to not only the downlink carrier aggregation but also the uplink carrier aggregation in the same manner. For example, the terminal 209 may transmit data or control information to the macro base station 201 through frequency f1' for uplink signal transmission. Further, the terminal 209 may transmit data or control information to the small base stations 203, 205, and 207 through frequency f2' for uplink signal transmission. The frequency f1' may correspond to f1, and f2' may correspond to f2. The uplink signal transmission of the terminal may be performed to the macro base station and the small base stations at different times or at the same time. Even in any case, due to the physical limit of a power amplifier element of the terminal and the radio wave regulation for the terminal emission power, the total sum of the uplink transmission power of the terminal should be maintained within a specific threshold value at a certain moment.

The main gist of the present invention is to define a method for controlling an uplink transmission power of the terminal in a communication system in which heterogeneous systems are combined to be operated. Specifically, if the total sum of the transmission power of the uplink signal to be intended by the terminal at a certain point exceeds the maximum transmission power value permitted to the terminal in the communication system in which the new radio access technology (RAT) and the LTE/LTE-A system are combined to be operated, the terminal follows the following power transmission method.

1) Method 1: A method for applying a priority of an uplink transmission signal

2) Method 2: A method for selectively applying a power control command for an uplink transmission interval 3) Method 3: A method for differently operating a time unit of terminal power control depending on whether to apply beam sweeping that changes the beamforming direction in accordance with time.

Through the above described method, the transmission power of the terminal can be efficiently managed, and the occurrence of the uplink interference signal can be lowered to heighten the system efficiently.

On the other hand, although the integrated system in which the base station taking charge of the new radio access technology and the LTE/LTE-A base station are combined is assumed as a main scenario, the main operation according to the present invention is also applicable to even a scenario in which both a normal TTI and a short TTI are applied in the LTE/LTE-A system.

All embodiments of the present invention may include a case where the first system uses the first TTI, the second system uses the second TTI, and the first TTI is longer than the second TTI.

Hereinafter, the LTE/LTE-A system will be described as an example of the system using the first TTI, and the system adopting the new radio access technology will be described as an example of the system using the second TTI that is shorter than the first TTI First Embodiment According to a first embodiment, method 1 among transmission power methods during transmission of an uplink signal of a terminal as described above will be described.

Figure 3:
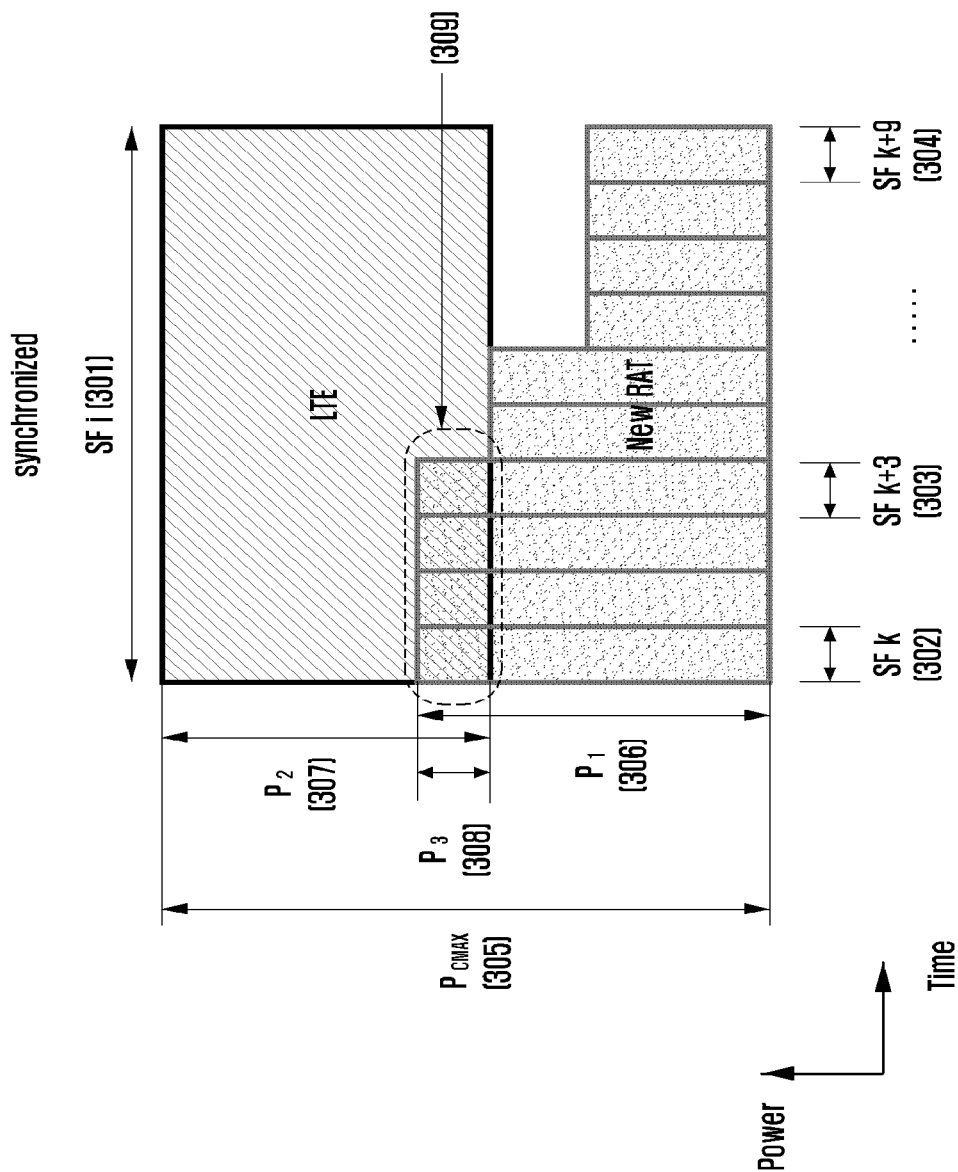
FIG. 3 is a diagram illustrating a mutual relationship between an uplink signal and a transmission power when a terminal transmits an uplink signal.

FIG. 3 is a diagram illustrating a mutual relationship between an uplink signal and a transmission power in the case where a terminal transmits an uplink signal to a base station adopting a new radio access technology simultaneously with transmitting the uplink signal to an LTE/LTE-A base station during a specific transmission interval.

In FIG. 3, a horizontal axis represents a time elapse, and a vertical axis represents the level of a transmission power. Further, FIG. 3 illustrates an example in which subframe i 301 of an LTE/LTE-A system overlaps subframes k 302 to k+9 304 of a new radio access system, and the start time of the subframe i 301 coincides with the start time of the subframe k 302. "TTI=1 ms" of the LTE/LTE-A system corresponds to the length of the subframe i 301, and a short TTI of the new radio access system corresponds to the length of the respective subframes k 302 to k+9 304.

Further, the maximum transmission power value permitted to the terminal is $P_{CMAX}$ 305, and the uplink transmission power to the LTE/LTE-A system calculated according to a power control command of the LTE/LTE-A base station at the start time of the subframe i 301 is $P_2$ 307, and the uplink transmission power to the new radio access system calculated according to a power control command of the base station to which the new radio access technology is applied at the start time of the subframe k 302 is $P_1$ 306.

The terminal applies the transmission power value calculated according to the power control command of the base station at the start time of the respective subframes to the uplink signal transmission, and constantly maintains the calculated transmission power in the same subframe in order to reduce a receiver complexity and to prevent the reception performance from deteriorating.

In an example of FIG. 3, it appears that the uplink transmission power to the new radio access system calculate according to the power control command of the base station to which the new radio access technology is applied at the start time of each subframe in an interval from the subframe k 302 to the subframe k+3 303 is $P_1$ 306. Accordingly, during an interval from the subframe k 302 to the subframe k+3 303, $P_1+P_2$ exceeds $P_{CMAX}$ as much as $P_3$ 308 (309).

In the above-described situation, the terminal may make the total sum of the uplink transmission power not exceed the $P_{CMAX}$ by reducing the transmission power of the uplink signal having a low priority while maintaining the transmission power of the uplink signal having high priority in accordance with the predefined priority.

For example, since the respective TTI lengths of the heterogeneous system are different from each other, start times at which the respective systems transmit the uplink signals are the same, and the whole uplink transmission power exceeds the maximum uplink transmission power, the terminal can reduce the uplink transmission power of any one system in accordance with the predetermined priority.

Hereinafter, referring to FIGS. 4 and 5, the contents in which the terminal reduces the uplink transmission power of any one system will be described in detail.

Figure 4:
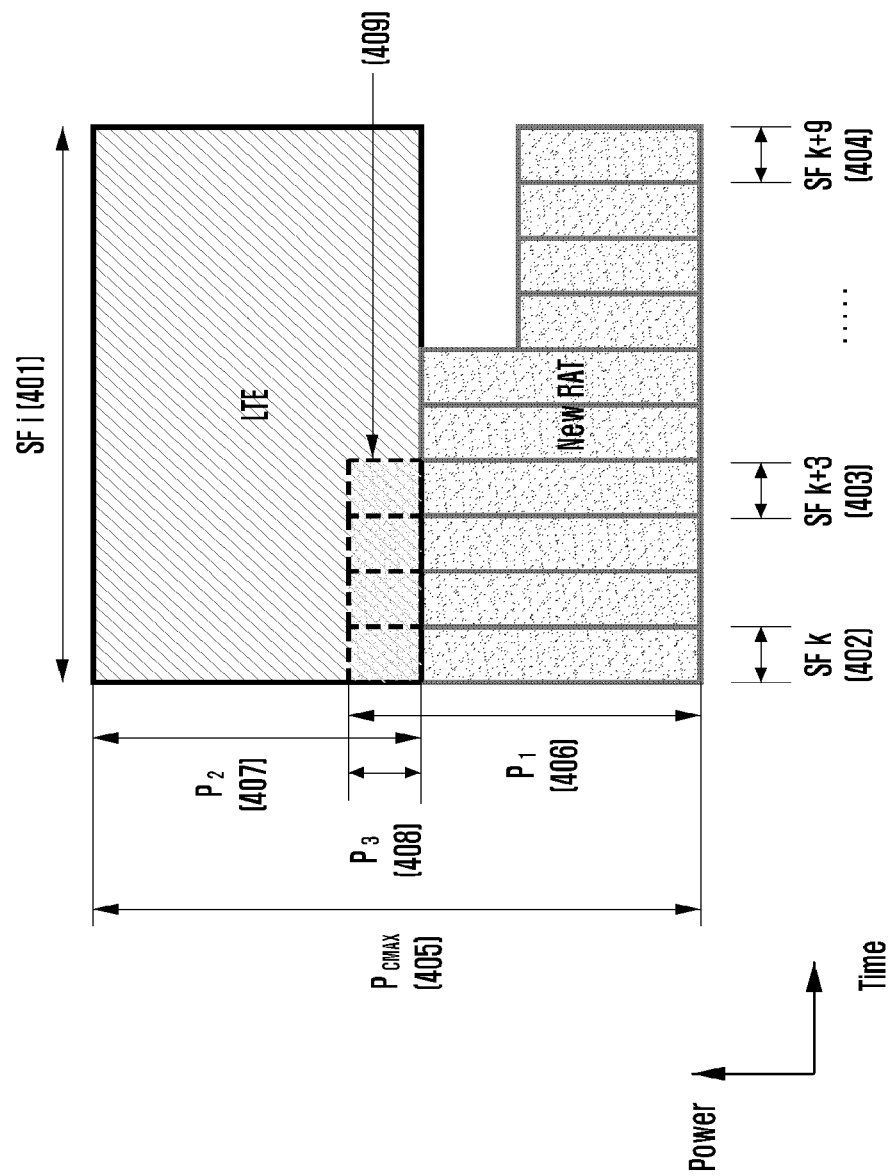
FIG. 4 is a diagram illustrating a method for a terminal to adjust a transmission power according to a first embodiment.

FIG. 4 is a diagram illustrating an embodiment (priority A) in which high priority is applied to an uplink signal being transmitted to an LTE/LTE-A base station. In the case of attaching importance to the terminal mobility of the LTE/LTE-A system, a power control operation as illustrated in FIG. 4 may be applied. Accordingly, the transmission power of the uplink signal transmitted to the LTE/LTE-A base station is maintained as it is as much as $P_2$ 407 calculated for the subframe i 401. In contrast, the transmission power of the uplink signal transmitted to the base station to which the new radio technology is applied as transmission power ($P_1-P_3$) that is obtained by subtracting $P_3$ 408 from $P_1$ 406 calculated for an interval from the subframe k 402 to the subframe k+3 403.

Figure 5:
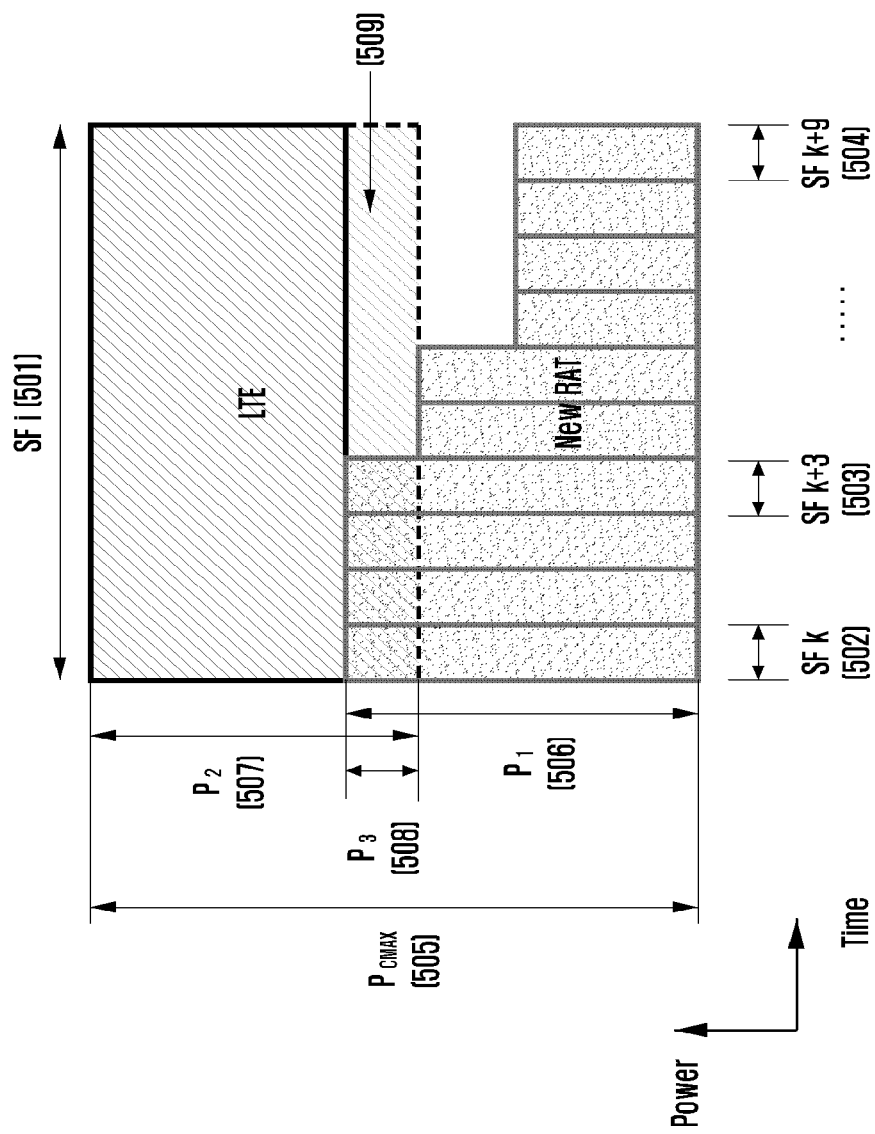
FIG. 5 is a diagram illustrating another method for a terminal to adjust a transmission power according to a first embodiment.

FIG. 5 is a diagram illustrating an embodiment (priority B) in which high priority is applied to an uplink signal being transmitted to a base station to which a new radio technology is applied. In the case of attaching importance to an ultra-high-speed data service or an ultra-low latency service of a system adopting the new radio technology, a power control operation as illustrated in FIG. 5 may be applied. Accordingly, the transmission power of the uplink signal transmitted to the base station adopting the new radio technology is maintained as it is as much as $P_1$ 506 calculated for an interval from the subframe k 502 to the subframe k+3 503. In contrast, the transmission power of the uplink signal transmitted to the LTE/LTE-A is applied as transmission power ($P_2-P_3$) that is obtained by subtracting $P_3$ 508 from $P_2$ 507 calculated for the subframe i 501.

According to the embodiments as described above with reference to FIGS. 4 and 5, a method for determining a priority corresponds to a case where it follows an indication signaled by the base station, a case where it is preset according to a service type used by the terminal, and a case where it is predetermined.

For example, the LTE/LTE-A base station or the base station adopting the new radio technology may transmit information on the priority to the terminal through higher layer signaling. The terminal that has received the information may determine whether to apply a high priority to the uplink signal transmitted to the LTE/LTE-A base station or to the uplink signal transmitted to the base station adopting the new radio technology.

Further, the terminal may also determine whether to apply a high priority to the uplink signal transmitted to the LTE/LTE-A base station or to the uplink signal transmitted to the base station adopting the new radio technology in accordance with the preset priority or a service type being used.

For example, in the case of using a service for which it is necessary to transmit/receive data in real time or in the case of using a service requiring ultra-low latency, the terminal may apply the high priority to the base station adopting the new radio technology having a short TTI.

According to another embodiment of the present invention, in contrast with the case of FIG. 3, the start time of the subframe i 301 in which the terminal transmits the uplink signal may not coincide with the start time of the subframe k 302. Since the terminal is limited in predicting in advance the operation after the current time, it applies a high priority to the signal transmission occurring at the current time (priority C).

Hereinafter, referring to FIGS. 6 and 7, a case where start times of the uplink signals transmitted to base stations do not coincide with each other will be described in detail.

Figure 6:
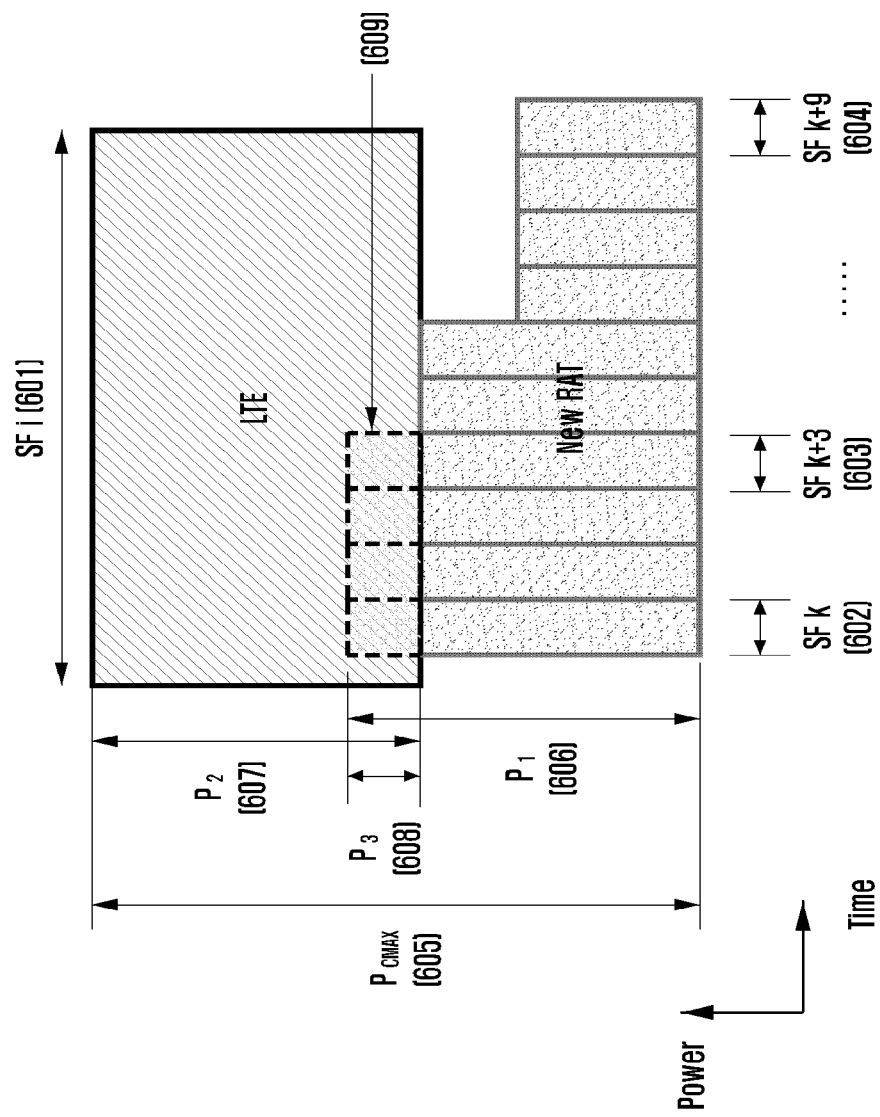
FIG. 6 is a diagram illustrating still another method for a terminal to adjust a transmission power according to a first embodiment.

FIG. 6 illustrates a case where the uplink signal transmitted to the LTE/LTE-A base station is generated earlier than the uplink signal transmitted to the base station adopting the new radio access technology, and shows an example in which a high priority is applied to the uplink signal transmitted to the LTE/LTE-A base station according to the priority C.

For example, since only the uplink signal transmitted to the LTE/LTE-A base station exists as the uplink signal to be transmitted by the terminal at the start time of subframe i 601, and $P_2$ 607 calculated according to a power control command of the base station does not exceed the maximum transmission power value $P_{CMAX}$ 605 permitted to the terminal, the terminal transmits the uplink signal transmitted to the LTE/LTE-A base station as the transmission power of $P_2$ 607. Thereafter, the uplink signal occurs, which is intended to be transmitted to the base station to which the new radio access technology is applied as the transmission power of $P_1$ 606. However, since the uplink signal transmitted to the LTE/LTE-A base station has already occupied the transmission power as much as $P_2$ 607, the transmission power that can be used by the terminal at the time of the subframe k 602 becomes $P_{CMAX}-P_2$ (or $P_1-P_3$). Accordingly, the terminal transmits the uplink signal with the transmission power as much as $P_{CMAX}-P_2$ with respect to the uplink signal transmitted to the base station adopting the new radio access technology.

In an example of FIG. 6, the transmission power of the signal intended to be transmitted to the base station adopting the new radio access technology for each subframe from the subframe k 602 to the subframe k+3 603 is calculated as P1 606 in accordance with the base station power control command, and thus a state where the available transmission power of the terminal is insufficient continues from the subframe k 602 to the subframe k+3 603. Accordingly, the terminal transmits the uplink signal with the transmission power as much as $P_{CMAX}-P_2$ with respect to the uplink signal transmitted to the base station adopting the new radio access technology.

Figure 7:
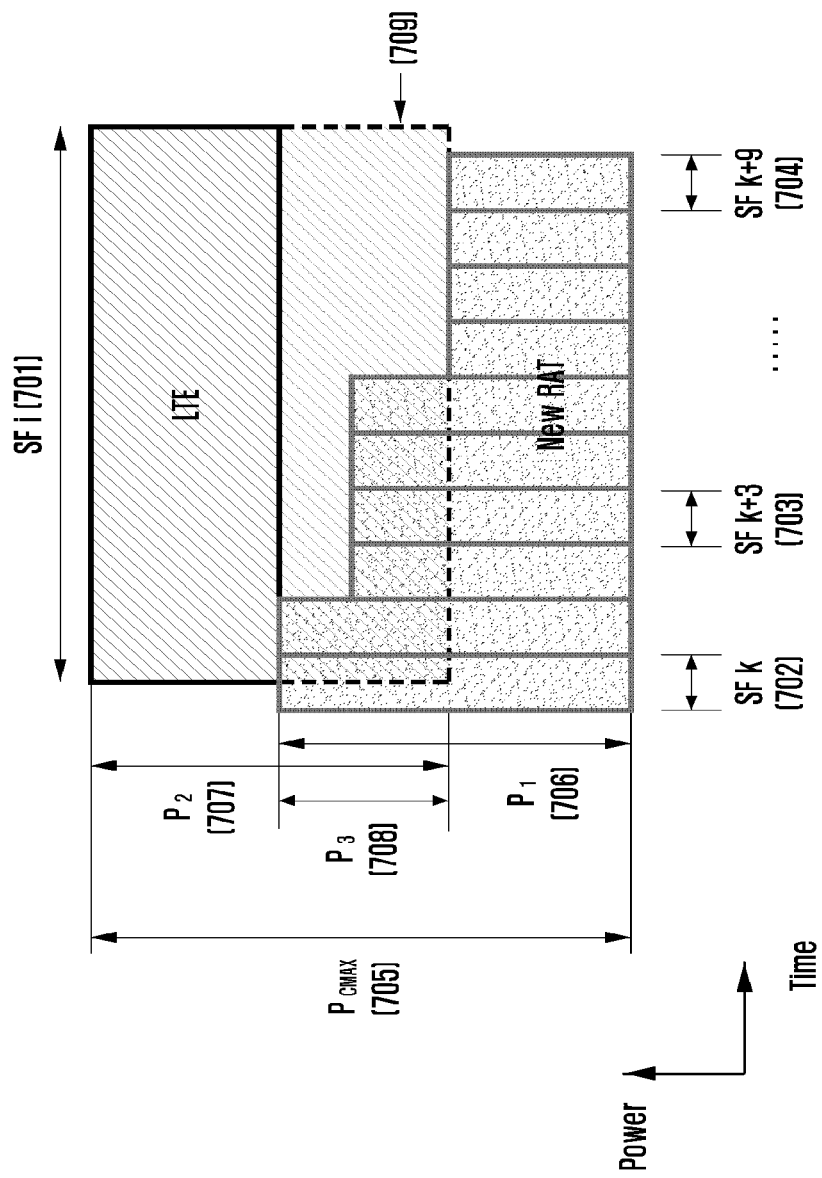
FIG. 7 is a diagram illustrating yet still another method for a terminal to adjust a transmission power according to a first embodiment.

On the other hand, FIG. 7 illustrates a case where the uplink signal transmitted to the base station adopting the new radio access technology is generated earlier than the uplink signal transmitted to the LTE/LTE-A base station, and shows an example in which a high priority is applied to the uplink signal transmitted to the base station adopting the new radio access technology according to the priority C.

That is, since only the uplink signal transmitted to the base station adopting the new radio access technology exists as the uplink signal to be transmitted by the terminal at the start time of subframe k 702, and $P_1$ 706 calculated according to a power control command of the base station does not exceed the maximum transmission power value $P_{CMAX}$ 705 permitted to the terminal, the terminal transmits the uplink signal transmitted to the base station adopting the new radio access technology as the transmission power of $P_1$ 706.

Thereafter, the uplink signal occurs, which is intended to be transmitted to the LTE/LTE-A base station with the transmission power of $P_2$ 707 at the start time of the subframe i 701. However, since the uplink signal transmitted to the base station adopting the new radio access technology has already occupied the transmission power as much as $P_1$ 706, the transmission power that can be used by the terminal for the subframe i 701 becomes $P_{CMAX}-P_1$ (or $P_2-P_3$). Accordingly, the terminal transmits the uplink signal with the transmission power as much as $P_{CMAX}-P_1$ for the subframe i 701 in which the available transmission power is insufficient and thus it is necessary to adjust the transmission power with respect to the uplink signal transmitted to the LTE/LTE-A base station.

In an example of FIG. 7, if the transmission power of the uplink transmitted to the base station adopting the new radio access technology is reduced after the subframe k+6 703 in accordance with the power control command of the base station, the transmission power as much as $P_2$ 707 calculated to be necessary at the start time of the subframe i 701 becomes available with respect to the uplink signal transmitted to the LTE/LTE-A base station.

However, the LTE/LTE-A base station determines the uplink transmission power in the unit of subframe i 701. Accordingly, the terminal has already adjusted the transmission power to the transmission power $P_{CMAX}$ to be transmitted at the start time of the subframe I 701, and thus any additional change of the transmission power is not performed in the same subframe i 701 in order to reduce the receiver complexity and to prevent the reception performance from deteriorating.

Figure 8:
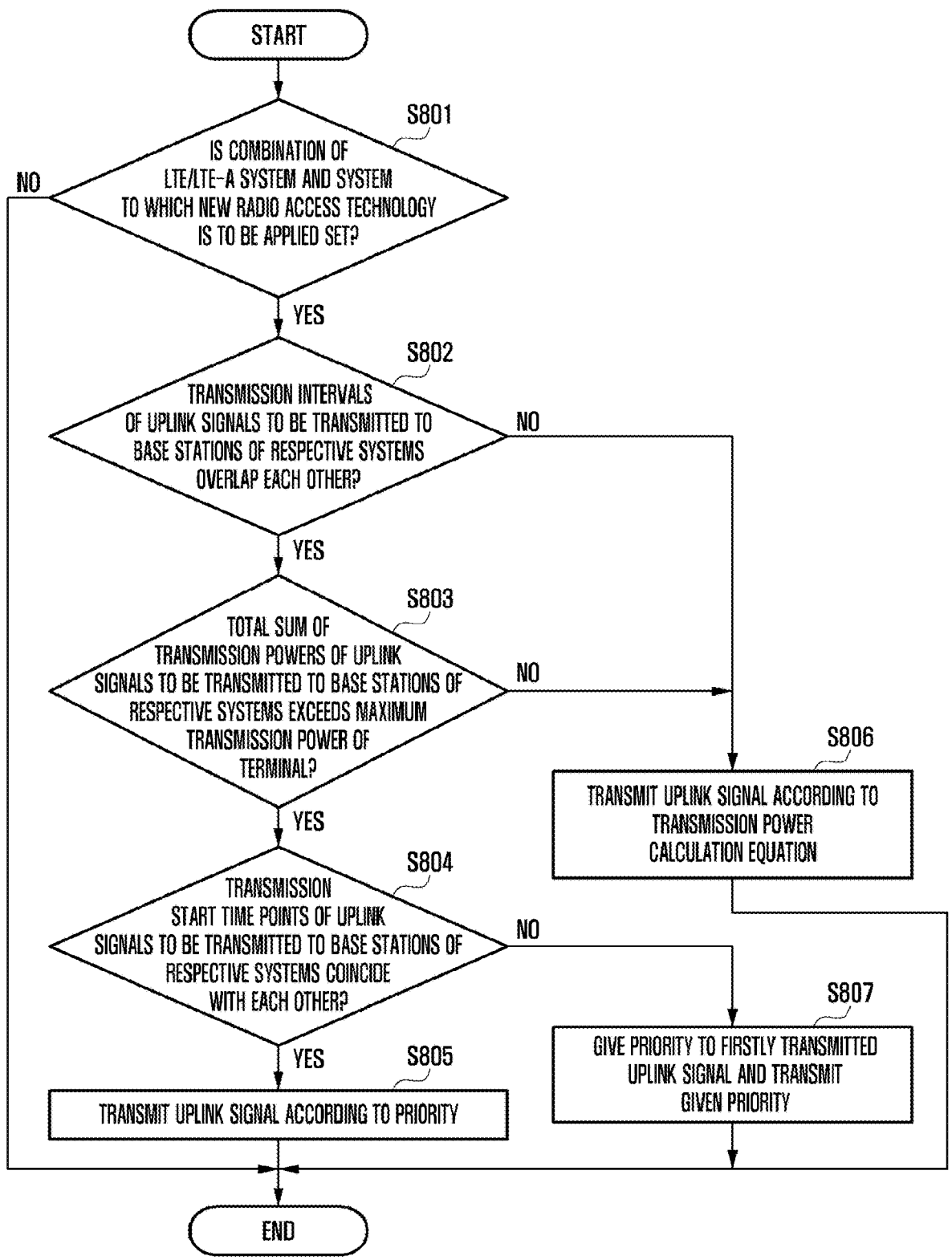
FIG. 8 is a flowchart illustrating a procedure in which a terminal adjusts a transmission power according to a first embodiment.

FIG. 8 is a flowchart illustrating a procedure in which a terminal adjusts a transmission power according to a first embodiment. First, at operation 801, the terminal receives from a base station a setup of a combination between an LTE/LTE-A system and a system adopting a new radio access technology. Accordingly, the terminal prepares the operation for the integrated system. The LTE/LTE-A system or the system adopting the new radio access technology notifies the terminal of the setup through signaling. The base station may send the signaling to the terminal supporting the combination between the LTE/LTE-A system and the system adopting the new radio access technology.

It is merely an embodiment that the terminal receives the setup of the combination between the LTE/LTE-A system and the system adopting the new radio access technology that are heterogeneous systems, and the present invention may include all embodiments to receive the setup of the combination of systems to which different TTIs are applied.

At operation 802, the terminal determines whether transmission intervals of the signals to be transmitted to the respective base stations overlap each other in accordance with the base station scheduling (condition 1). If the transmission intervals do not overlap each other, the terminal, at operation 806, transmits the uplink signal in accordance with a specific transmission power calculation rule.

If the transmission intervals of the signals to be transmitted to the respective base stations overlap each other as the result of the determination at operation 802, the terminal, at operation 803, determines whether the total sum of the transmission powers of the uplink signals intended to be transmitted to the respective base stations exceeds the maximum transmission power value permitted to the terminal in accordance with the power control command of the base station (condition 2). If the total sum does not exceed the maximum transmission power value, the terminal performs a procedure at operation 806.

If the total sum of the transmission powers of the uplink signals exceeds the maximum transmission power value permitted to the terminal as the result of the determination at operation 803, the terminal, at operation 804, determines whether transmission start times of the uplink signals to be transmitted to the respective base stations coincide with each other (condition 3). If the transmission start times coincide with each other, the terminal, at operation 805, transmits the uplink signals in accordance with the predetermined priorities. In this case, the priority may be priority A or priority B as described above.

For example, if the LTE/LTE-A system has the priority, the terminal may maintain the transmission power of the uplink signal for the LTE/LTE-A system, and the transmission power of the uplink signal for the system adopting the new radio access technology is obtained by subtracting the transmission power value of the uplink signal for the LTE/LTE-A system from the maximum transmission power value permitted to the terminal, so that the uplink signals can be transmitted for the respective systems.

On the other hand, if the transmission start times do not coincide with each other as the result of the determination at operation 804, the terminal, at operation 807, the terminal gives a high priority to the first transmitted uplink signal to be transmitted (priority C). In the order disclosed in FIG. 8, the order of the operations 803 and 804 may be changed to each other.

Second Embodiment

According to a second embodiment, method 2 among transmission power methods during transmission of an uplink signal of a terminal as described above will be described.

Figure 9:
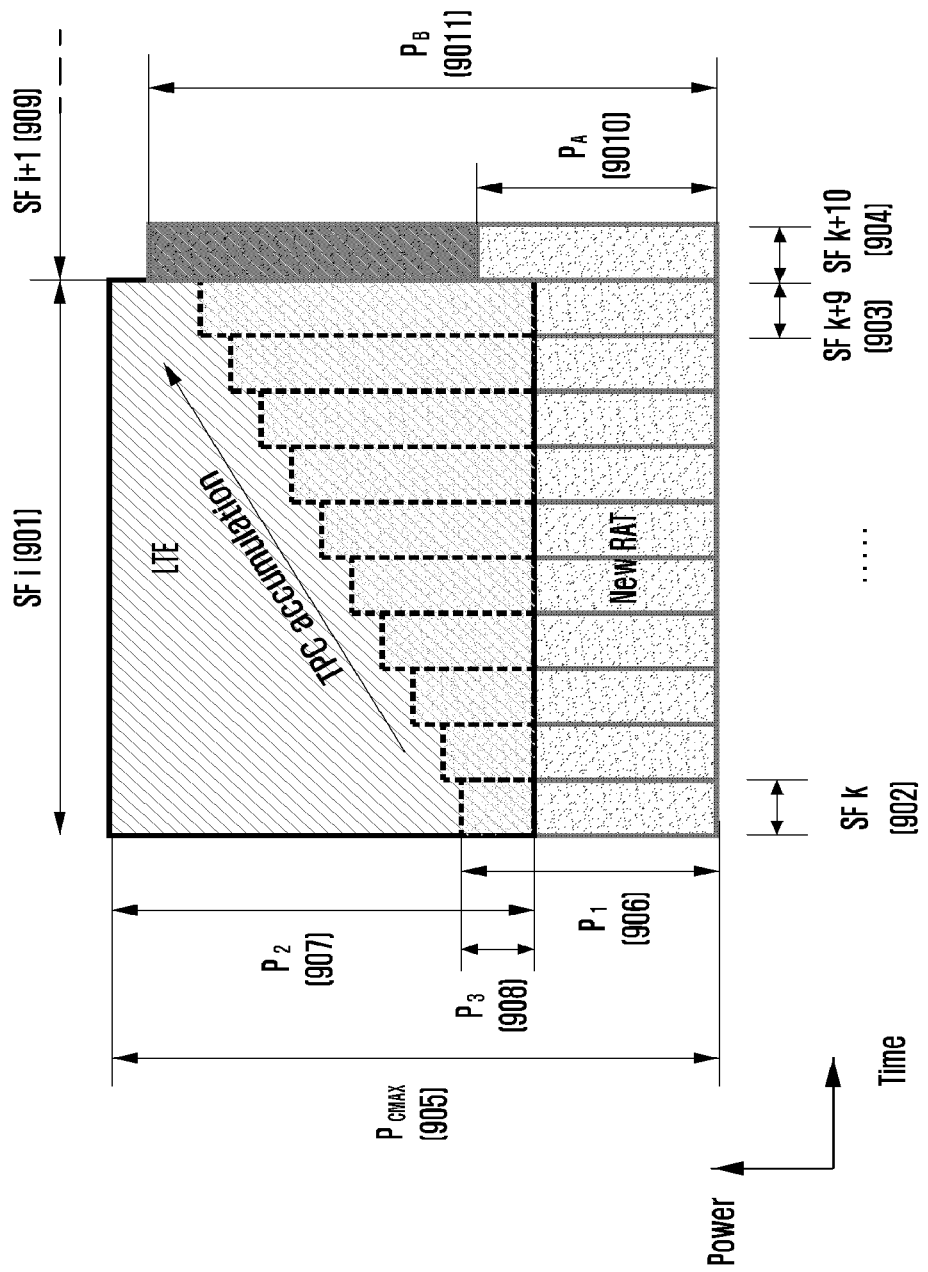
FIG. 9 is a diagram illustrating a method for a terminal to adjust a transmission power according to a second embodiment.

According to an embodiment of the present disclosure, FIG. 9 shows a situation where the terminal receives a power control command from the base station in the case of adjusting the transmission power of the uplink transmission signal due to the limit of the maximum transmission power value permitted to the terminal.

FIG. 9 illustrates an embodiment in which subframe i 901 of an LTE/LTE-A system overlaps subframes k 902 to k+9 903 of a new radio access system. For example, the maximum transmission power value permitted to the terminal is $P_{CMAX}$ 905, and the uplink transmission power to the LTE/LTE-A system calculated according to a power control command of the LTE/LTE-A base station at the start time of the subframe i 901 is $P_2$ 907, and the uplink transmission power to the new radio access system calculated according to a power control command of the base station to which the new radio access technology is applied at the start time of the subframe k 902 is $P_1$ 906. Since $P_1+P_2$ calculated as above exceeds $P_{CMAX}$ as much as $P_3$ 908, the terminal makes the total sum of the uplink transmission power not exceed the $P_{CMAX}$ by reducing the transmission power of the uplink signal having a low priority.

In an embodiment illustrated in FIG. 9, the terminal applies a high priority to the uplink signal transmitted to the LTE/LTE-A base station in accordance with "priority A" as described above in the first embodiment. Accordingly, the terminal transmits the uplink signal to the LTE/LTE-A base station by applying the transmission power of the uplink signal as much as $P_2$, and transmits the uplink signal to the new radio access system by reducing the transmission power of the uplink signal as much as $P_3$ from $P_1$ calculated as above ($P_1-P_3$).

The terminal performs the power control operation through reception of the power control command from the base station for each subframe, and if the terminal continuously receives a transmit power control (TPC) command indicating the "increase" of the transmission power from the base station adopting the new radio access technology, the terminal continuously increase the transmission power as much as a predetermined amount from $P_1$ calculated at the start time of the subframe k 902. However, since the uplink signal that the terminal transmits to the LTE/LTE-A base station occupies the transmission power as much as $P_2$ during the subframe i 901, the transmission power available to the uplink signal that the terminal actually transmits to the new radio access system from the subframes k 902 to k+p 903 of the new radio access system of which the transmission interval overlaps the subframe i 901 is limited to $P_{CMAX}-P_2$ at maximum.

As a result, the uplink signal is transmitted to the LTE/LTE-A base station having a priority with the transmission power as much as $P_2$ for the subframe i 901, and although the TPC command indicating the "increase" of the transmission power is continuously received from the base station adopting the new radio access technology, the terminal should transmit the uplink signal to the new radio access system with the transmission power of $P_{CMAX}-P_2$.

If the terminal does not have the uplink signal to be transmitted to the LTE/LTE-A base station any more at the time of the subframe i+1 909, the transmission power that can be used for the uplink signal that the terminal intends to transmit to the base station adopting the new radio access technology of which the transmission interval overlaps the subframe i+1 909 may not limited to $P_{CMAX}-P_2$, but becomes $P_{CMAX}$ at maximum. In such a situation, the uplink transmission power of the terminal in the subframe k+10 904 may be determined as in the following mathematical expression 1.

$$P(n)=\min\{P_{CMAX}, \text{ParametersetA}+ PL+f(n)\} \quad \text{[Mathematical Expression 1]}$$

P(n): uplink transmission power of a terminal in the n-th subframe

ParametersetA: This includes a value set by the base station and signaled to the terminal in order to compensate for uplink interference and a value for reflecting a scheduled transmission bandwidth with respect to the uplink transmission signal or modulation and coding scheme (MCS) in the transmission power control of the terminal.

PL: This denotes a path loss between the base station and the terminal. The terminal can calculate the path loss from a difference between the transmission power of a reference signal (RS) signaled by the base station and the terminal reception signal level of the reference signal (RS).

f(n): This denotes a power control state function calculated with respect to the subframe n, and has the following relationship.

$$f(n)=f(n-1)+\Delta(n-K)$$

In this case, $\Delta(n-K)$ denotes a power control command that the terminal has received from the base station in the (n−K)-th subframe, and K is a constant determined in consideration of the processing time of the terminal.

Referring to an embodiment of FIG. 9, when the terminal calculates the power control state function f(n) of the uplink signal to be transmitted to the base station adopting the new radio access technology in the subframe k+10 904, the terminal may accumulatively reflect all power control commands from the subframes k 902 to k+9 903, in which the transmission power of the terminal is limited to $P_{CMAX}-P_2$, and in this case, the waste of the terminal power and the uplink interference may occur due to excessive transmission power setup as much as $P_B$ 911.

For example, it is difficult for the base station that has transmitted the power control command to know the transmission power limit situation of the terminal in the subframes k 902 to k+9 903. Accordingly, the base station may wrongly determine that the reason why the strength of the received signal is at the level of $P_1-P_3$ rather than at the level of $P_1$ 906 that is determined as a proper transmission power of the uplink signal is that the radio channel environment is not good. In this case, there is a possibility that the base station commands continuous "increase" as a power control command for the terminal.

In order to prevent such a situation, the power control command for the subframes k 902 to k+9 903 may be made to exceed the available maximum transmission power $P_{CMAX}-P_2$ of the terminal, and in this case, the power control command may not be reflected in the power control state function. Further, if the power control command is made not to exceed the available maximum transmission power of the terminal, the terminal may calculate the final uplink transmission power of the terminal by reflecting the power control command in the power control state function.

Accordingly, in an example of FIG. 9, the uplink transmission power of the terminal in the subframe k+10 904 is determined as $P_A$ 910. This may be generalized and expressed as in mathematical expression 2 below.

$$f(n)=f(n-1)+\Delta(n-K), \text{if } P(n) \leq P_{CMAX}-P_2 \quad \text{[Mathematical Expression 2]}$$

otherwise, $f(n)=f(n-1)$.

Figure 10:
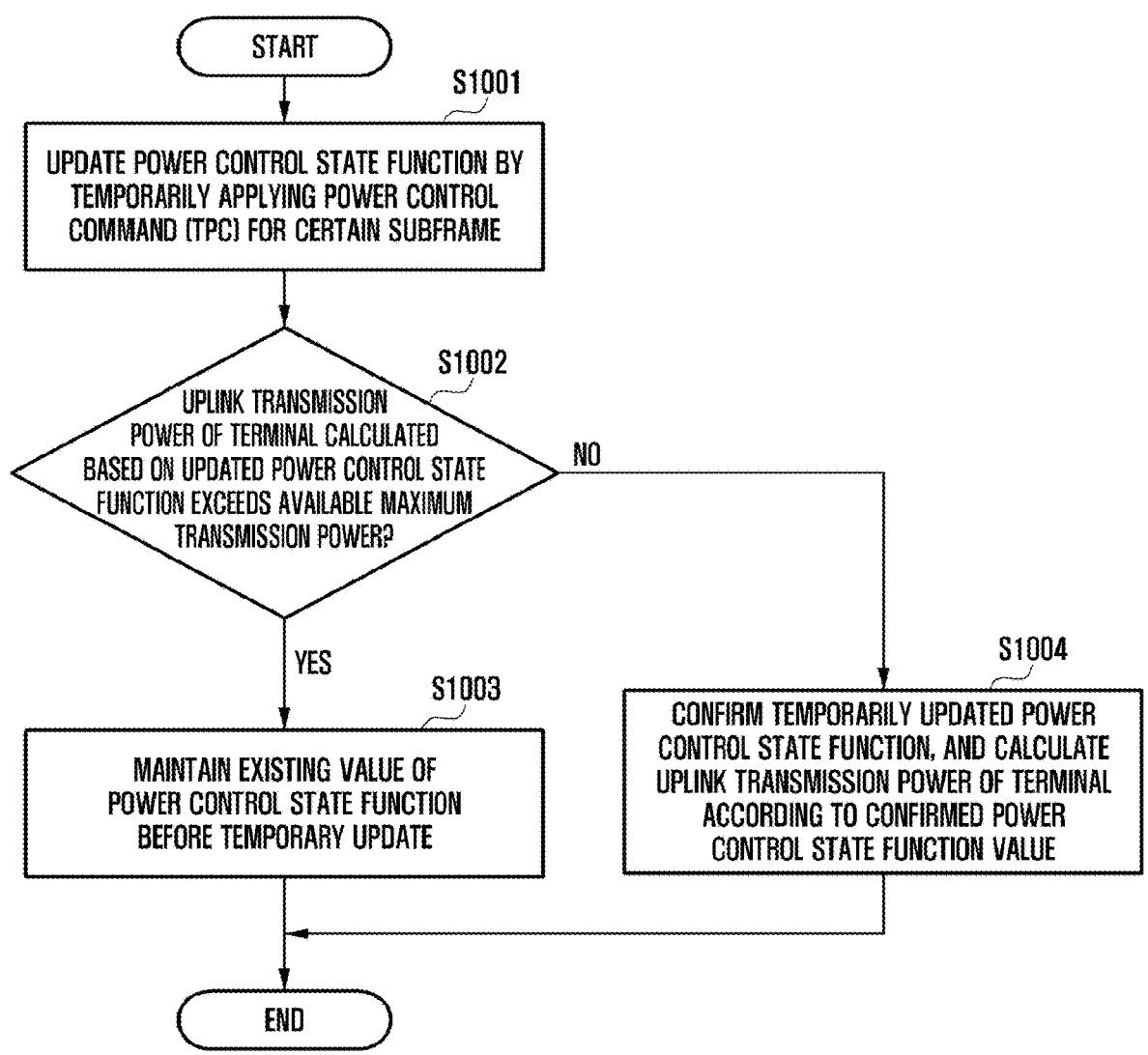
FIG. 10 is a flowchart illustrating a procedure in which a terminal adjusts a transmission power according to a second embodiment.

On the other hand, FIG. 10 is a flowchart illustrating a procedure in which a terminal determines a transmission power according to a second embodiment. The procedure of FIG. 10 may correspond to the operation after operation 805 or 807 of FIG. 8.

At operation 1001, the terminal updates the power control state function by temporarily applying a power control command (TPC) for a certain subframe. For example, the terminal updates the power control state function by temporarily applying the power control command for the current subframe n.

At operation 1002, the terminal calculates the uplink transmission power of the terminal by reflecting the updated power control state function, and determines whether the uplink transmission power exceeds the available maximum transmission power of the terminal.

If the uplink transmission power of the terminal calculated based on the updated power control state function exceeds the available maximum transmission power as the result of the determination, the terminal, at operation 1003, cancels the power control state function temporarily updated at operation 1001, and calculates the uplink transmission power of the terminal by maintaining the existing power control state function as it is.

If the uplink transmission power of the terminal does not exceed the available maximum transmission power of the terminal as the result of the determination, the terminal, at operation 1004, confirms the power control state function temporarily updated at operation 1001 as the actual power control state function value, and calculates the uplink transmission power of the terminal accordingly.

Third Embodiment

According to a third embodiment, method 3 among transmission power methods during transmission of an uplink signal of a terminal as described above will be described. In the third embodiment, it is assumed that the terminal applies beam sweeping with respect to an uplink signal transmitted to a base station adopting a new radio access technology.

As described above, in order to compensate for a high path loss of a radio wave transmitted in an ultrahigh frequency band, a beamforming technology has become important, which increases an arrival distance of the radio wave through concentration of radiation energy of the radio wave on a specific target point using a plurality of antennas. The beamforming technology essentially requires optimum beam direction determination and feedback between a transmitter and a receiver. Beam sweeping is a technology to determine the optimum beam direction with reception of feedbacks in respective beam directions by successively changing the beam directions of a beamformed signal and transmitting the beamformed signal in various directions if the feedback for the beamforming is limited and it becomes difficult to know the optimum beam direction. The beam sweeping may be used in an initial access stage of the terminal or for sounding reference signal (SRS) transmission for the purpose of channel state feedbacks. The terminal transmits to the base station the beamformed signals with respect to the respective beam directions in due order in a beam sweeping period (BSP).

Figure 11:
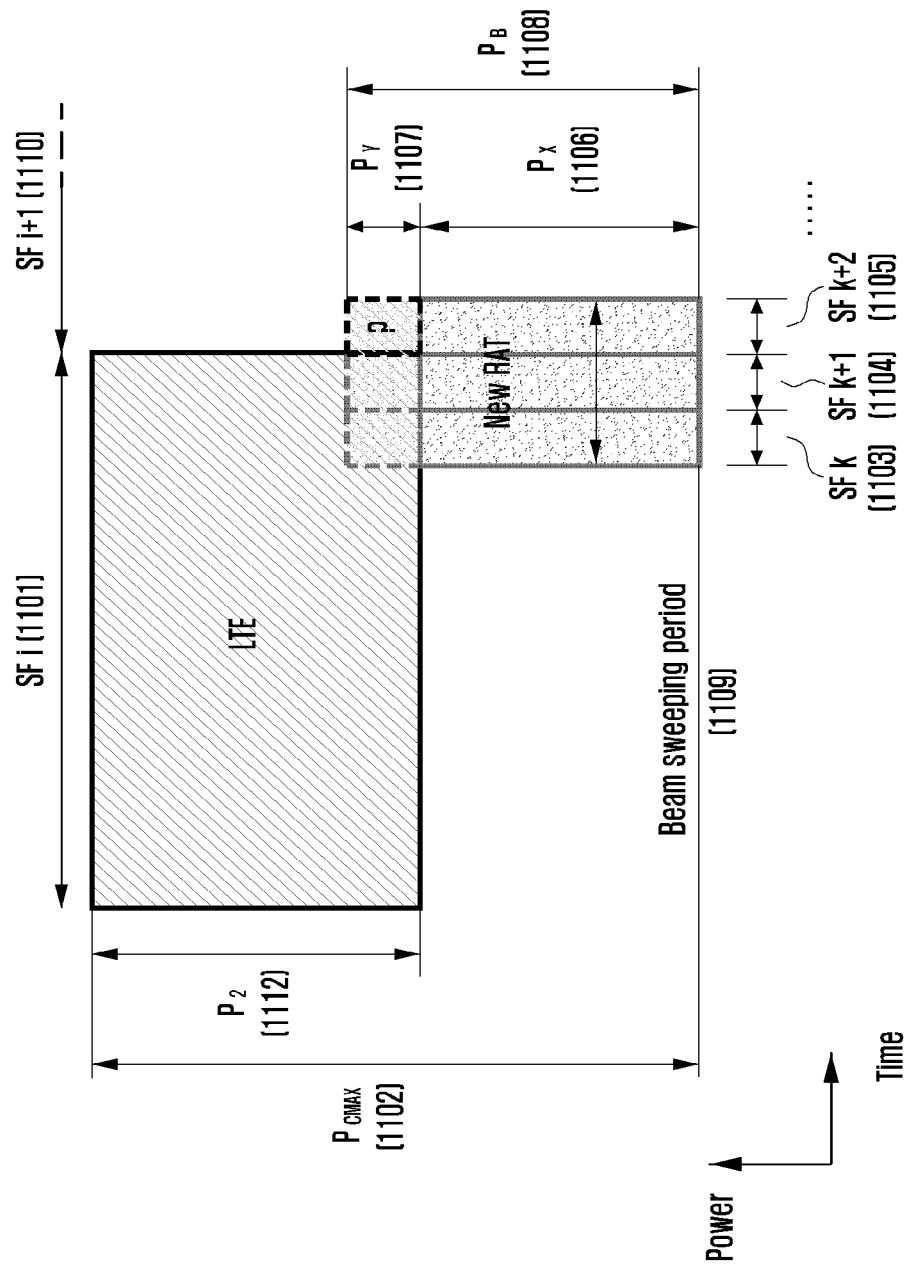
FIG. 11 is a diagram illustrating a method for a terminal to adjust a transmission power according to a third embodiment.

FIG. 11 is a diagram illustrating a method for a terminal to adjust a transmission power according to a third embodiment of the present invention. In an embodiment of FIG. 11, it is exemplified that subframe i 1101 of an LTE/LTE-A system overlaps subframes k 1103 to k+1 1104 of a new radio access system. The maximum transmission power value permitted to the terminal is $P_{CMAX}$ 1102, and the uplink transmission power to the LTE/LTE-A system calculated according to the power control command of the LTE/LTE-A base station at the start time of the subframe i 1101 is $P_2$ 1112, and the uplink transmission power to the new radio access system calculated according to the power control command of the base station to which the new radio access technology is applied at the start time of the subframe k 1103 is $P_x$ 1106 obtained by reducing $P_Z$ 1108 as much as $P_y$ 1107 so as not to exceed the maximum allowable transmission power value $P_{CMAX}-P_2$ permitted to the terminal at the time of the subframe k 1103. Further, in the embodiment as illustrated in FIG. 11, the beam sweeping period 1109 is a period from the subframe k 1103 to the subframe k+2 1105, and during the beam sweeping period, the terminal successively transmits the beamformed signals to the base station while changing the beam directions.

In the subframe k+2 1105 that does not overlap the transmission period of the LTE/LTE-A uplink signal transmission in the subframe i 1101, the maximum available transmission power of the terminal is $P_{CMAX}$, and the terminal can secure the transmission power as much as $P_Z$ 1108 intended to be applied in the subframe k 1103 that is the start time of the beam sweeping.

However, since the main purpose of the beam sweeping is to receive the optimum beamforming direction fed back from the receiving side, the change of the transmission power of the beamforming signal in the beam sweeping period is not preferable. For example, the receiving side determines the optimum beamforming direction by comparing the reception strengths of the beamforming signals received in the respective beam directions with each other, and if the transmission power of the beamforming signal is changed during the beam sweeping period, the change of the transmission power may be misunderstood as the change of the channel state, and this may be an obstacle in determining the optimum beamforming direction.

Accordingly, the terminal can constantly maintain the transmission power $P_X$ 1106 of the beamforming signal during the beam sweeping period 1109.

Figure 12:
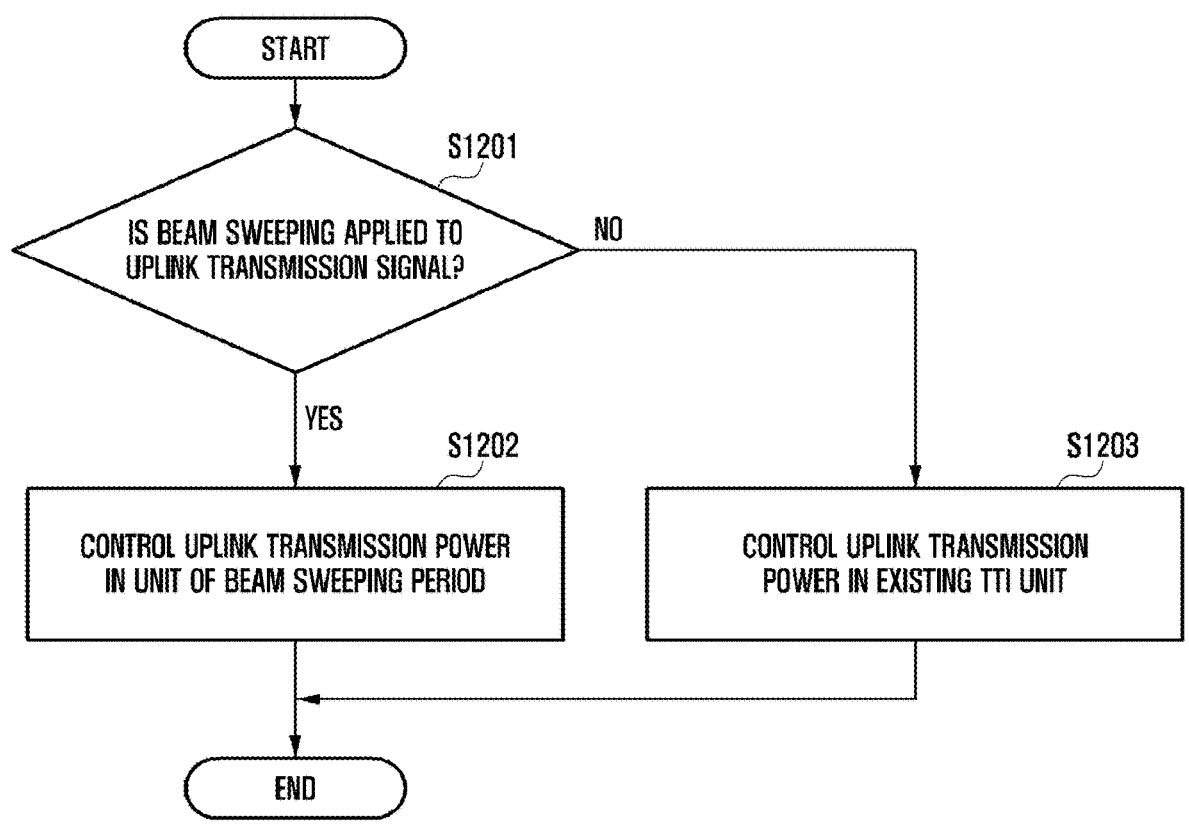
FIG. 12 is a flowchart illustrating a procedure in which a terminal adjusts a transmission power according to a third embodiment.

FIG. 12 is a flowchart illustrating a procedure in which a terminal adjusts a transmission power according to a third embodiment of the present invention. The procedure of FIG. 12 may correspond to the operation after operation 805 or operation 807 of FIG. 8.

First, at operation 1201, the terminal may determine whether beam sweeping is applied to an uplink transmission signal to be transmitted. If the beam sweeping is not applied as the result of the determination, the terminal, at operation 1103, performs power control in the unit of a subframe as in the existing method. For example, the terminal may control the uplink transmission power in the existing unit of TTI.

If the beam sweeping is applied as the result of the determination, the terminal, at operation 1102, performs the uplink transmission power control in the unit of a beam sweeping interval.

Figure 13:
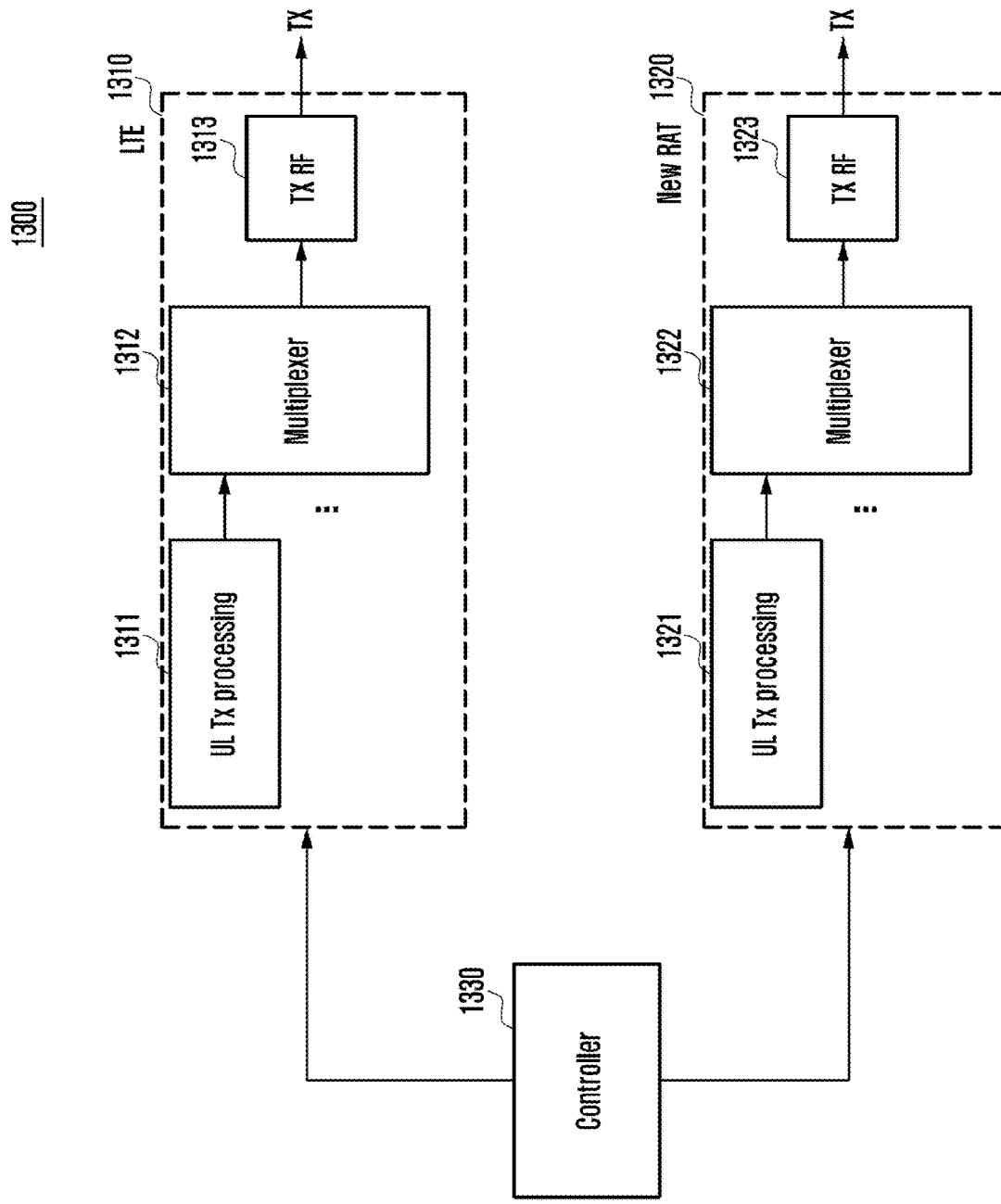
FIG. 13 is a diagram illustrating a terminal transmission device according to the present invention.

FIG. 13 is a diagram illustrating a terminal transmission device according to the present invention. For convenience in explanation, illustration and explanation of devices that are not directly related to the present invention will be omitted.

Referring to FIG. 13, a terminal 1300 includes a transmission unit 1310 for an LE/LTE-A base station composed of an uplink transmission processing block 1311, a multiplexer 1312, and a transmission RF block 1313, a transmission block 1320 for a new radio access base station composed of an uplink transmission processing block 1321, a multiplexer 1322, and a transmission RF block 1323, and a controller 1330. The controller 1330 controls configuration blocks of the transmission units 1310 and 1320 for controlling an uplink transmission power of the terminal from scheduling information received from the respective base stations. As described above, the controller 1330 performs detailed transmission power control depending on whether transmission intervals of the uplink signals that the terminal 1300 intends to transmit to the respective base stations, whether the total sum of the uplink transmission power of the terminal 1300 exceeds the maximum allowable transmission power of the terminal, whether start points coincide with each other during transmission of the uplink signals that the terminal 1300 intends to transmit to the respective base stations, and whether beam sweeping is applied to the uplink transmission signal of the terminal 1300.

In the transmission units 1310 and 1320 for the respective base stations, the uplink transmission processing blocks 1311 and 1321 performs channel coding and modulation processes to generate signals to be transmitted. The signals generated from the uplink transmission processing blocks 1311 and 1321 are multiplexed with other uplink signals by the multiplexers 1312 and 1322, and then processed by the transmission RF blocks 1313 and 1323 to be transmitted to the respective base stations.

On the other hand, the terminal may include a transceiver and a controller. The transceiver may perform communication with a first network transmitting and receiving data in the unit of a first transmission time interval (TTI) and a second network transmitting and receiving data in the unit of a second transmission time interval (TTI).

The controller is a constituent element configured to perform overall control of the terminal 1300. The controller may control an uplink transmission power with respect to at least one of the first network and the second network. Further, the control of the uplink transmission power may be performed in accordance with respective TTI lengths of the first and second networks.

On the other hand, the controller may be configured to reduce the transmission power with respect to any one of the first network and the second network in accordance with a priority if the uplink transmission power transmitted to the first network and the second network exceeds a maximum transmission power.

Further, the controller may be configured to determine a high priority with respect to an uplink transmission for the network of which the uplink transmission starts earlier in time between the first network and the second network.

On the other hand, the controller may be configured to control the transceiver to receive information on the priority by a higher layer signaling of the base station of the first network.

Further, the controller may be configured to transmit the uplink signal preferentially to the first network if the uplink transmission power transmitted to the first network and the second network exceeds a maximum transmission power, and if the uplink signal transmission to the first network is ended, the controller may be configured to determine the uplink transmission power to the second network based on a power control command received from a base station of the second network.

On the other hand, the controller may be configured to determine the uplink transmission power to the second network without reflecting the power control command if the uplink transmission power to the second network according to the power control command exceeds the uplink transmission power transmitted to the second network during transmission of the uplink signal to the first network, and may be configured to determine the uplink transmission power to the second network by reflecting the power control command if the uplink transmission power to the second network according to the power control command is equal to or lower than the uplink transmission power transmitted to the second network during transmission of the uplink signal to the first network.

Further, the controller may be configured to change a unit of the uplink transmission power control for the second network to a beam sweeping period in the second TTI if the controller performs beam sweeping with respect to the second network.

On the other hand, the controller may be configured to reduce the transmission power for the second network so that the transmission power does not exceed the maximum transmission power if the uplink transmission power transmitted to the first network and the second network exceeds the maximum transmission power, and the first network has a priority or the uplink transmission to the first network starts earlier in time, and the controller may be configured not to change the transmission power for the second network during performing of the beam sweeping to the second network.

Further, the first TTI may be 1 ms, and the second TTI is smaller than 1 ms.

Figure 14:
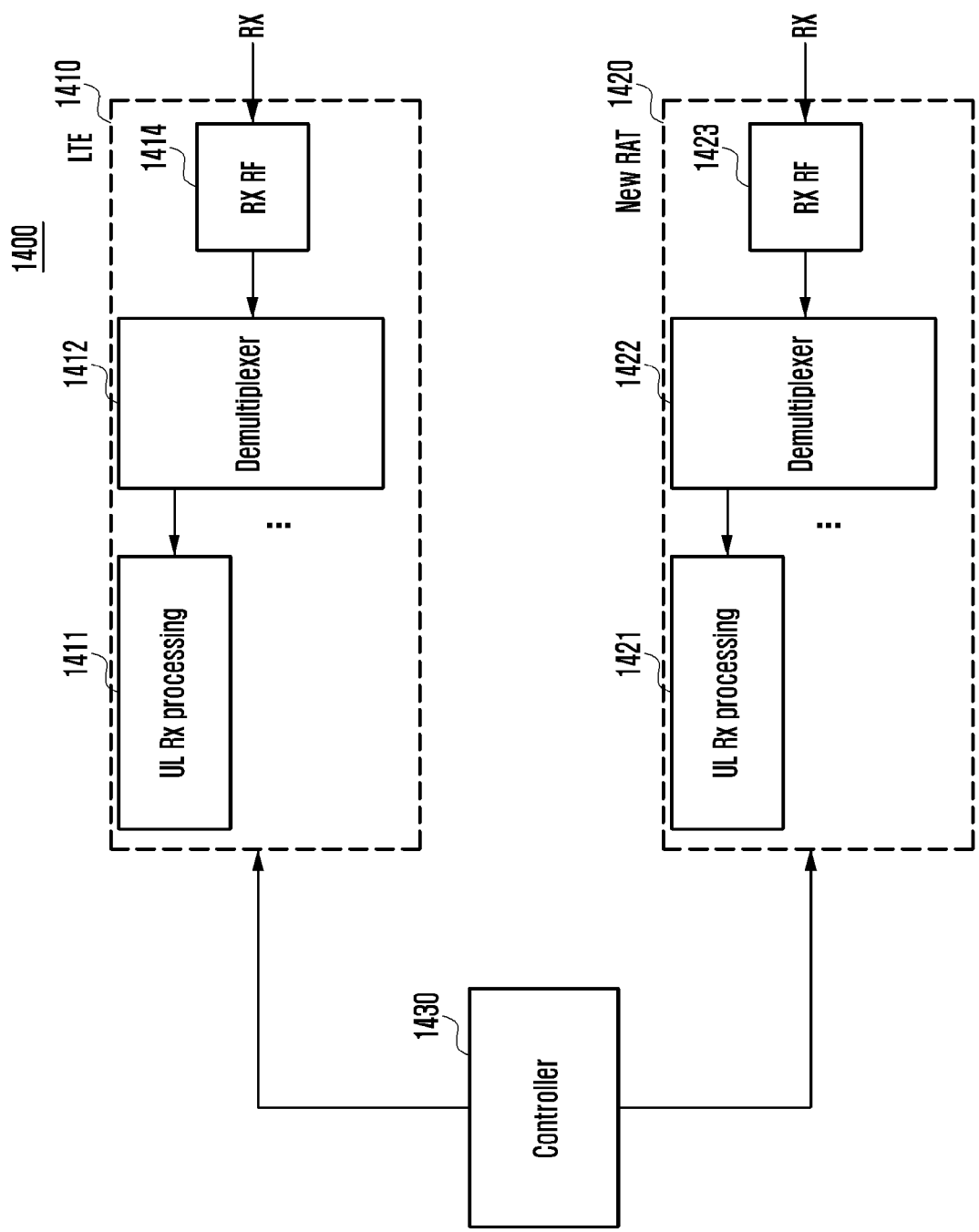
FIG. 14 is a diagram illustrating a base station reception device according to the present invention.

FIG. 14 is a diagram illustrating a base station reception device according to the present invention. For convenience in explanation, illustration and explanation of devices that are not directly related to the present invention will be omitted.

A base station device 1400 includes an LE/LTE-A reception unit 1410 composed of an uplink reception processing block 1411, a demultiplexer 1412, and a reception RF block 1413, a new radio access reception unit 1420 composed of an uplink reception processing block 1421, a demultiplexer 1422, and a reception RF block 1423, and a controller 1430. The controller 1330 controls a base station reception operation during an uplink signal of the terminal, and it controls the operations of respective configuration blocks of the base station reception units 1410 and 1420.

The respective reception units 1410 and 1420 demultiplex signals received from the terminal to distribute the signals to respective uplink reception processing blocks. The uplink reception processing blocks 1411 and 1421 acquire control inform information or data transmitted by the terminal by performing demodulation and channel decoding processes with respect to the uplink signal of the terminal. The respective reception units 1410 and 1420 support the operation of the controller 1430 by applying the output result of the uplink reception processing blocks to the controller.

On the other hand, the base station 1400 may include a transceiver and a controller. The transceiver is a constituent element configured to transmit and receive signals.

The controller is a constituent element configured to perform overall control of the base station 1400. The controller may be configured to generate information on a priority and to transmit the information on the priority to a terminal through higher layer signaling.

The terminal may be configured to perform communication with the base station and one other base station.

Further, the base station is configured to transmit and receive data in the unit of a first transmission time interval (TTI), and the other base station is configured to transmit and receive data in the unit of a second transmission time interval (TTI).

Further, the information on the priority may be information for the terminal to control an uplink transmission power in accordance with the priority in the unit of at least one of the first TTI and the second TTI.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

What is claimed is:

1. A terminal in a wireless communication system, comprising:
    a transceiver; and
    a controller configured to:
        control the transceiver to receive, from a first base station, a message including configuration information for adding a second base station to the terminal;
        identify whether a first uplink transmission to the first base station overlaps in time with a second uplink transmission to the second base station;
        identify whether a sum of a first transmission power for the first uplink transmission and a second transmission power for the second uplink transmission exceeds a configured maximum transmission power of the terminal, based on the first uplink transmission overlapping in time with the second uplink transmission; and
        control the second transmission power for the second uplink transmission, based on the sum exceeding the configured maximum transmission power of the terminal,
    wherein a transmission time interval (TTI) used by the first base station is 1 ms, and
    wherein a TTI used by the second base station is shorter than or equal to 1 ms.

2. The terminal of claim 1, wherein the controller is configured to maintain the first transmission power and reduce the second transmission power in an overlapped portion.

3. The terminal of claim 2, wherein a sum of the first transmission power and the reduced second transmission power is smaller than or equal to the configured maximum transmission power of the terminal.

4. The terminal of claim 1, wherein the first base station uses on an evolved-universal terrestrial radio access (E-UTRA) radio access technology and the second base station uses a new radio (NR) radio access technology.

5. A first base station in a wireless communication system, comprising:
    a transceiver; and
    a controller configured to:
        control the transceiver to transmit, to a terminal, a message including configuration information for adding a second base station to the terminal; and
        control the transceiver to receive, from the terminal, a first uplink transmission based on a first transmission power, wherein the first uplink transmission overlaps in time with a second uplink transmission from the terminal to the second base station, wherein a second transmission power for the second uplink transmission is controlled by the terminal, based on a sum of the first transmission power and the second transmission power exceeding a configured maximum transmission power of the terminal, wherein a transmission time interval (TTI) used by the first base station is 1 ms, and wherein a TTI used by the second base station is shorter than or equal to 1 ms.

6. The first base station of claim 5, wherein the first base station uses an evolved-universal terrestrial radio access (E-UTRA) radio access technology and the second base station uses a new radio (NR) radio access technology.

7. The first base station of claim 5, wherein the first transmission power is maintained and the second transmission power is reduced by the terminal, in an overlapped portion.

8. The first base station of claim 7, wherein a sum of the first transmission power and the reduced second transmission power is smaller than or equal to the configured maximum transmission power of the terminal.

9. A method by a terminal in a wireless communication system, the method comprising:

receiving, from a first base station, a message including configuration information for adding a second base station to the terminal;

identifying whether a first uplink transmission to the first base station overlaps in time with a second uplink transmission to the second base station;

identifying whether a sum of a first transmission power for the first uplink transmission and a second transmission power for the second uplink transmission exceeds a configured maximum transmission power of the terminal, based on the first uplink transmission overlapping in time with the second uplink transmission; and controlling the second transmission power for the second uplink transmission, based on the sum exceeding the configured maximum transmission power of the terminal, wherein a transmission time interval (TTI) used by the first base station is 1 ms, and wherein a TTI used by the second base station is shorter than or equal to 1 ms.

10. The method of claim 9, wherein controlling comprises:

controlling the first transmission power to maintain and the second transmission power to reduce, in an overlapped portion.

11. The method of claim 10, wherein a sum of the first transmission power and the reduced second transmission power is smaller than or equal to the configured maximum transmission power of the terminal.

12. The method of claim 9, wherein the first base station uses on an evolved-universal terrestrial radio access (E-UTRA) radio access technology and the second base station uses a new radio (NR) radio access technology.

13. A method by a first base station in a wireless communication system, the method comprising:

transmitting, to a terminal, a message including configuration information for adding a second base station to the terminal; and receiving from the terminal, a first uplink transmission based on a first transmission power, wherein the first uplink transmission overlaps in time with a second uplink transmission from the terminal to the second base station, wherein a second transmission power for the second uplink transmission is controlled by the terminal, based on a sum of the first transmission power and the second transmission power exceeding a configured maximum transmission power of the terminal, wherein a transmission time interval (TTI) used by the first base station is 1 ms, and wherein a TTI used by the second base station is shorter than or equal to 1 ms.

14. The method of claim 13, wherein the first transmission power is maintained and the second transmission power is reduced by the terminal, in an overlapped portion.

15. The method of claim 14, wherein a sum of the first transmission power and the reduced second transmission power is smaller than or equal to the configured maximum transmission power of the terminal.

* * * * *